March 28, 1967   F. E. HALSTEAD   3,311,030
SELF-ALIGNING PACKING GLAND ARRANGEMENTS
Filed Feb. 9, 1965   2 Sheets-Sheet 1
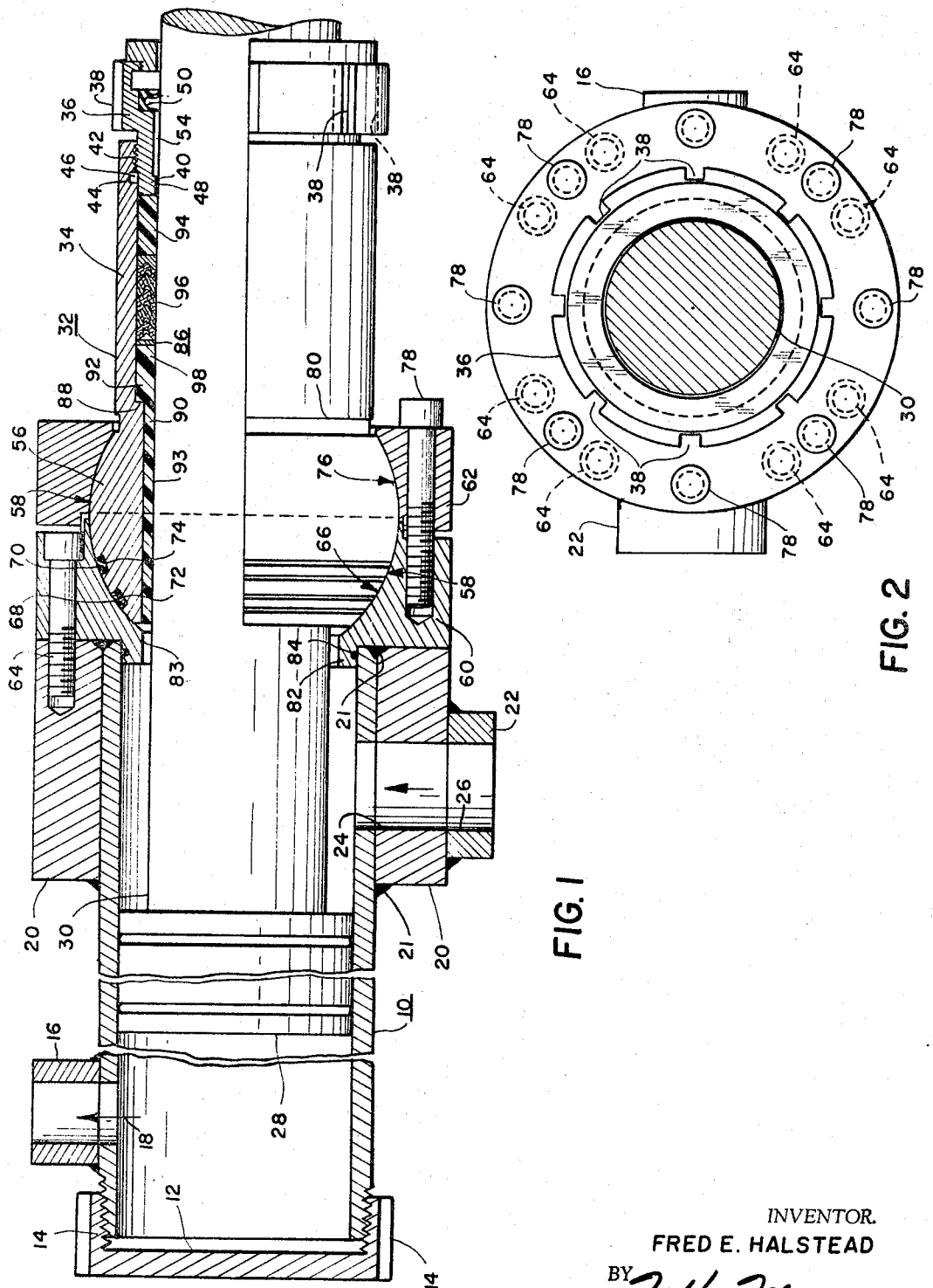
INVENTOR.
FRED E. HALSTEAD
BY
his ATTORNEY March 28, 1967  F. E. HALSTEAD  3,311,030
SELF-ALIGNING PACKING GLAND ARRANGEMENTS
Filed Feb. 9, 1965   2 Sheets-Sheet 2

INVENTOR.
FRED E. HALSTEAD
BY
his ATTORNEY

United States Patent Office

3,311,030
Patented Mar. 28, 1967

3,311,030
SELF-ALIGNING PACKING GLAND ARRANGEMENTS
Fred E. Halstead, Rochester, Pa., assignor to Halstead Metal Products, Inc., Zelienople, Pa., a corporation of Pennsylvania
Filed Feb. 9, 1965, Ser. No. 431,278
3 Claims. (Cl. 92—118)

The present invention relates to packing glands, and more particularly to a gland of the character described adapted for use with a linearly moving element which is subjected to a significant angular deflection relative to its normal path of travel.

While not limited thereto, the present invention is adapted for use in drawing operations wherein workpieces are drawn through a suitable die structure by means of a hydraulic cylinder and piston arrangement. In such applications, the length of the cylinder and its associated piston rod, which extends out of the cylinder at the beginning of the drawing operation, may be forty feet or even more. Under these circumstances, the weight of the free length of the piston rod is such that a significant downward sag is produced therein despite the tensional forces induced by the internal hydraulic pressure within the cylinder as the piston rod is drawn into the cylinder.

Of course, as the piston rod length is shortened, the amount of the aforementioned sag is reduced, which produces an attendant variation in the angular deflection of the piston rod at its entrance into the cylinder. The angular displacement of the piston rod relative to its cylinder thus induces considerable and rapid wearing of conventional packing glands used at the point of entry of the piston rod into its cylinder. Moreover, as the angular displacement of the piston rod relative to the cylinder will vary from a maximum when the piston rod is fully extended or fully retracted into the cylinder to a minimum intermediate its extreme positions, the mere angular disposition of a conventional gland at some intermediate angle would offer no significant increase in the wearability of the gland.

The result of such wearing of conventional packing glands in drawing operations is an excessive loss of oil or other fluid used to pressurize the cylinder. It can be observed, for example, that in a representative hydraulic drawbench installation, as much as fifty gallons of the hydraulic fluid in the system is lost through a conventional cylinder packing gland in as little as one week. Apart from the costly loss of hydraulic fluid, such leakage through a packing gland creates an unsightly appearance around the drawing equipment due to an accumulation of the fluid on the floor.

In addition to the inherent weight of the piston rod, wear of a conventional packing gland in cylinders of great length results from other factors. For example, the rod has a tendency to vibrate as it is drawn into, or pushed out of, the cylinder, thereby accentuating wear. Furthermore, where the piston rod is under load and that load suddenly released, as at the completion of a drawing operation, a whiplash effect is produced tending to enlarge the inside diameter of the packing gland in what can be compared to a reaming action.

In an effort to counteract the inherent downward sag of the piston rod due to its own weight, attempts have been made to pre-arch the rod upwardly. Such attempts, however, have been only partially successful at most and have not been effective against the vibrational and whiplash phenomena mentioned above.

The present invention resides in the discovery that by providing a unique and efficient packing gland which is capable of self-alignment with whatever displacement angle the linearly moving element may be subjected to throughout its path of travel, excessive wear and leakage through the packing gland can be eliminated. This is accomplished by mounting the packing gland on one element of a ball and socket arrangement such that the element on which the gland is mounted will follow the deflection curve of the piston rod as it passes through the head, regardless of whether the deflection be due to bending of the rod from its inherent weight, vibrational forces, a whiplash effect or other causes.

In view of the foregoing, an object of the invention is the provision of a novel and efficient packing gland. More specifically, an object of the invention is the provision of a gland of the character described which is self-aligning.

Another object of the invention is the provision of a packing gland of the character described which is adapted for use with an elongated piston and cylinder arrangement.

Another object of the invention is the provision of a self-aligning packing gland and means associated therewith for maintaining an effective seal between external portions of the packing gland and a casing or housing or the like with which it is used during anticipated angular deflections of the packing gland relative to the casing or housing.

A further object of the invention is the provision of a unique end closure and alignable packing gland for use with a piston and cylinder arrangement or the like.

These and other objects, features and advantages of the invention will be elaborated upon more fully in the following description taken in conjunction with the accompanying drawings, wherein:

FIGURE 1 is a longitudinal view, partially in section, of one form of self-aligning packing gland of the invention together with an illustrative application thereof for use with a drawbench piston and cylinder arrangement or the like;

FIG. 2 is an end view of the packing gland and cylinder enclosure arrangement shown in FIG. 1;

Figure 3:
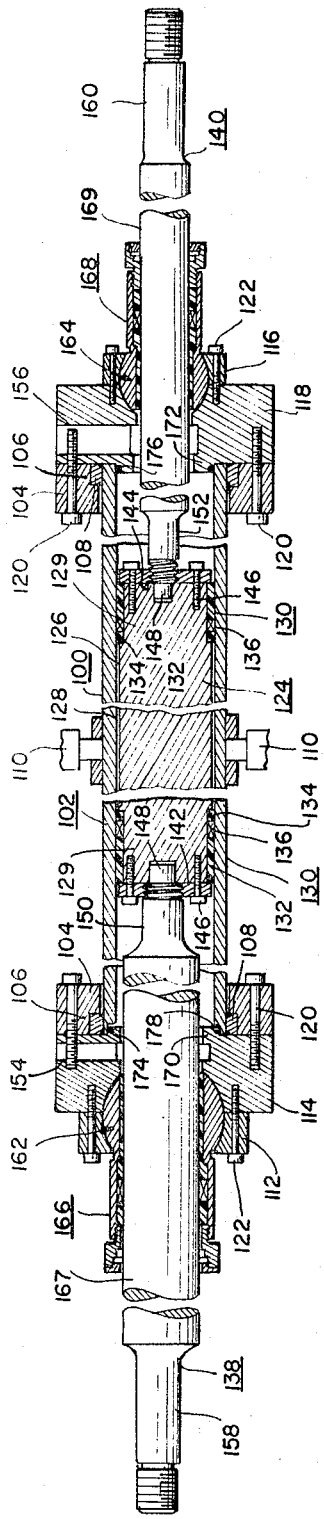
FIG. 3 is a cross-sectional view of a double-ended cylinder and piston arrangement incorporating the principles of the invention.

Referring now to the drawings, and particularly to FIGS. 1 and 2, the embodiment of the invention illustrated therein includes an elongated cylinder housing 10, the left end portion of which, as viewed in FIG. 1 of the drawings, is threadedly engaged with an end closure or cap 12 of circular configuration. Suitable wrench pockets 14 are spaced about the periphery of the cap 12 for use in tightening or loosening the cap.

A port, represented by the conduit segment 16, also is provided adjacent the left end of the cylinder housing 10 for exit of the hydraulic fluid during the power stroke of the piston. Of course, the hydraulic flow will be reversed from that indicated by arrow 18 when it is desired to return the piston to its starting position.

Adjacent the right end of the cylinder housing 10, as viewed in FIG. 1 of the drawings, is a thickened mounting bolt-receiving portion 20, one side of which is provided with a port for hydraulic fluid represented by the conduit segment 22. Desirably, the thickened portion 20 is furnished in the form of a heavy ring member preferably welded thereto as denoted by reference character 21. The cylinder housing 10 and the ring member 20 are provided, respectively, with aligned openings 24 and 26 which, in turn, are aligned with the central opening of the conduit section 22 to complete the port leading into the housing cylinder.

A piston 28 is mounted for reciprocating movement within the housing 10. An elongated piston rod 30 is secured at one end to the piston 28 and extends through the self-aligning bearing and packing gland denoted generally by the reference character 32 and described in greater detail below. The piston rod 30 is quite large in diameter relative to the inside diameter of the cylinder housing 10 in order to impart sufficient structural rigidity thereto and in order to minimize deleterious deflection of the piston rod as it is withdrawn from the cylinder.

Having thus described the environmental details of one exemplary application of the invention, attention will now be given to a detailed description of the self-aligning packing gland and bearing itself. The packing gland and bearing 32, in this arrangement of the invention, includes a cylindrical housing portion 34, the right end of which, as viewed in FIG. 1 of the drawings, is threaded for engagement with a packing gland nut indicated generally by reference character 36. As better shown in FIG. 2 of the drawings, the gland nut 36 is provided with a plurality of wrench pockets 38 spaced equidistantally about its periphery for the purpose of manipulating the nut 36 during assembly or disassembly of the gland. A cylindrically protrusion 40 extends inwardly of the threaded junction 42 between the housing 32 and the gland nut 36, by which protrusion variable longitudinal pressure is applied to the packing and bearing arrangement presently to be described.

The aforementioned protrusion 40, together with a circumferential groove 44 on the adjacent inner surface of the housing 32, define a space 46 therebetween. Furthermore, an inwardly extending lip 48 of the protrusion 40 also defines the opening of the packing gland through which the piston rod 30 extends with suitable clearance. Near the outer end of the gland nut 36 a suitably disposed grooved and stepped configuration on the inner surface of the gland nut are arranged to contain a wiping seal 50 fabricated from neoprene or the like. The wiping seal 50 also defines, together with the aforementioned lip 48, a second space 54.

At the left end of the gland housing 32, as viewed in FIG. 1, the housing 32 is provided with a thickened portion 56, the outer surface of which is spherical in configuration. The outer surface 58 is shaped for complementary engagement with similarly shaped central openings of inner and outer clamping rings 60 and 62. The inner clamping ring 60, which is secured to the adjacent ring member 20 of the cylinder housing 10 through the use of a number of mounting bolts 64, as better seen in FIG. 2 of the drawings, is provided with an inner opening 66 of spherical contour for closely fitted engagement with the adjacent portion of the gland housing spherical surface 58. Leakage between the engaged spherical surfaces 58 and 66 is effectively prevented in this example by a pair of O-ring seals denoted generally by reference characters 68 and 70, which are disposed in circumferentially extending grooves 72 and 74 formed in the adjacent surface of the thickened gland portion 56.

The O-ring seals 68 and 70 are compressed into sealing engagement as shown in FIG. 1 by the aforementioned clamping ring 62 which likewise is provided with an inner spherical opening 76 for closely fitting engagement with the adjacent portion of the spherical surface 58 of the packing gland. With the clamping ring 62 thus engaged, and before the gland nut 36 is assembled to the gland housing 32, the clamping ring 62 is secured to the closure ring 60 by means of mounting bolts 78, the number and disposition of which are better shown in FIG. 2 of the drawings. When thus assembled, angular displacement of the gland housing 32 is permitted relative to the cylinder housing 10 by means of circumferential groove 80 which is disposed at the junction between the gland housing 32 and its thickened portion 56, i.e., at the most restricted portion of the spherically contoured opening extending through the clamping ring 62.

When the clamping rings 62–60 are thus assembled to the cylinder ring member 20, a tubular protrusion 82 of the clamp ring 60 is inserted into the right end of the cylinder housing 10. The opening 83 of the protrusion 82 affords sufficient clearance for the piston rod 30 extending therethrough. When thus inserted, the protrusion 82 with its O-ring seal 84 provides an effective seal against leakage through the junction between the cylinder end and mounting ring 20 and the clamp ring 62. As pointed out above, leakage between the spherical, thickened portion 56 of the packing gland housing 32 and the spherical socket formed by the spherical portion 66 and 76 of the clamping rings 60–62 is similarly prevented by O-ring seals 68 and 70. While two seals 68 and 70 are shown herein, it should be understood that a single seal will suffice, the second being included as a safety factor only.

The final possibility of leakage from the cylinder housing 10, of course, lies along the surface of the piston rod 30 where the latter extends through the packing gland housing 32. This avenue of leakage is effectively prevented by a bearing and packing arrangement denoted generally by the reference character 86. It is extremely important, of course, that the bearing and packing arrangement 86 be aligned at all times with the varying angular deflection of the piston rod 30. As pointed out above, this is accomplished with the unique packing gland of the invention by pivotal engagement of its spherical surface 58 and the complementary spherical surfaces of openings 66 and 76 of the clamping rings 60–62.

The packing and bearing arrangement 86 is maintained under compression by means of the gland nut 36 described previously, and by inwardly extending shoulder 88 formed adjacent the outward extremity of the gland housing thickened portion 56. In furtherance of this purpose, bearing member 90 is provided with a complementary outwardly extending shoulder portion 92 for engagement with the housing shoulder 88. The thus thinned portion 93 of the bearing member 90, therefore, extends through the annular space between the piston rod 30 and the gland housing 32 in the region of its clamped spherical portion 56 and additionally is not under substantial longitudinal compression.

Compressed between the bearing member 90 and a second bearing member 94 is a quantity of conventional packing material. The latter material can be provided in the form of the chevron type seal denoted generally by the reference character 96. The second bearing member 94 and the thickened portion 98 of the first-mentioned bearing member 90 together with the chevron seal 96 are then placed under longitudinal compression, by suitably tightening the gland nut 36, in order to effectuate the proper sealing and bearing properties thereof. The bearing members 90 and 94 can be fabricated from a suitable bearing material such as nylon or bronze. Nylon, however, is preferable for the application described herein because of its greater elasticity and "self-healing" properties.

With the arrangement thus described, it will be readily seen that the self-aligning packing gland of the invention is effective in preventing leakage and in providing adequate bearing for a linearly moving element such as the piston rod 30, irrespective of the angular displacement of the linearly moving element relative to its path, i.e., relative to the longitudinal axis of the cylinder housing 10. Moreover, the gland housing provides an effective closure against leakage for the housing structure, for example, the cylinder housing 10 with which it is employed. Finally, the dead weight of the piston is supported at the center of the spherical joint such that the weight of the piston is more or less uniformly distributed over a relatively wide arc defined by spherical portions 66 and 76 beneath the portion 56.

Referring now to FIG. 3 of the drawings, the illustrative form of the invention depicted therein is shown as a combined packing gland and double-acting piston and cylinder arrangement denoted generally by the reference character 100 and including a cylinder 102 having at each end thereof a relatively closely fitting bolt ring 104. Each of the bolt rings 104 is provided with a stepped portion 106 wherein it engages a welded retaining ring 108 at each outer end of the cylinder 102. At the midpoint of the cylinder 102, the latter is supported, in this example, in a horizontal position for pivotal movement through a vertical arc by means of a horizontal trunnion arrangement, the engaging portions of which are denoted generally by reference characters 110. That is to say, the trunnion axis is disposed substantially normal to the plane in which the angular displacements of the piston rods 138 and 140 (noted below) are expected to occur.

The bolt rings 104 are arranged for connection to respective pairs of clamping rings 112, 114, 116 and 118 by means of mounting bolts 120 and 122, respectively, for the purposes pointed out hereinafter.

A double-acting piston 124 is mounted for reciprocating movement within the cylinder 102 and in furtherance of this purpose, includes a relatively thicker midsection 126 which, however, is made sufficiently smaller than the bore of the cylinder 102 to provide clearances 128. Adjacent each end of the piston 124, the piston is necked-down slightly to accommodate at each end a sealing means 130.

In this arrangement, each sealing means 130 includes a pair of bearing members 132 and 134 closely fitted in the annular space between the necked-down piston portions 129 and the bore of the cylinder 102. The bearing members 132 and 134 are longitudinally spaced from one another to permit the insertion therebetween of suitable packing material denoted by the reference character 136. If desired, the packing material 136 can be provided in the form of a chevron seal such as that described at 96 in FIG. 1 of the drawings. The bearing members 132 and 134 can be fabricated from nylon or bronze, with nylon being preferred because of its "self-healing" property, and can extend a short distance beyond the related piston end for preliminary engagement with the clamping annuli 142 and 144, described below to preload the bearing and packing members.

At each end of the piston 124, an elongated piston rod 138 or 140 is joined as by threading to a clamping annulus 142 or 144, respectively. At each end of the piston, the clamping annulus 142 or 144 is bolted thereto by means of mounting bolts 146. Desirably, an end portion 148 of each piston rod 138 or 140 is closely fitted into a recess therefor at each end of the piston to provide stability for the piston rod connection thus far described.

In the arrangement of the invention as illustrated in FIG. 3, the left-hand piston rod 138 is made relatively thicker and, therefore, is intended to be used for the return stroke when the double-acting cylinder is used in the drawbench operation described briefly above. On the other hand, the right-hand piston rod 140, as viewed in FIG. 3 of the drawings, is made of lighter construction and is intended for the power stroke of the piston. The piston rods 138 and 140 are provided with inward necked-down portions 150, 152, respectively, for attachment thereof to the aforementioned threaded clamping annuli and to promote the passage of hydraulic fluid therealong from the openings 154 and 156 provided therefor in the respectively adjacent clamping rings 114 and 118. Similar necked-down portions 158 and 160 are provided at the outer ends respectively of the piston rods 138 and 140 for securement thereof to suitable operating mechanisms (not shown) connected respectively thereto during the power and return motions of the piston 124.

Each pair of clamping rings 112–114 and 116–118 is provided with spherical openings therein for complementary engagement with the spherical outer surface 162 or 164 of a self-aligning packing gland 166 or 168, respectively, for pivotal movement of the packing glands relative to their clamping rings and to the cylinder 102. The packing glands 166 and 168 are substantially similar to the self-aligning packing gland 32 described previously in connection with FIG. 1 of the drawings and accordingly will not be further elaborated upon. Suffice it to say, however, that the self-aligning packing gland 168 employed with the power stroke piston rod is provided in a smaller overall size and internal bore to accommodate the smaller size of the power stroke piston rod 140. The openings through the clamping rings 118 and 116 associated with the smaller packing gland 168 are likewise sized appropriately smaller.

The thickened intermediate piston portions 167 and 169, respectively, of course, are sufficiently long as to co-extend with the anticipated areas of engagement of the piston rods with the packing glands throughout their stroke.

With the arrangement of the invention as illustrated in FIG. 3, it will be evident that the self-aligning packing glands 168 and 166, which also serve as end closures, together with their clamping rings, 112–114 and 118–116, respectively, for the double-acting cylinder 102, in the manner pointed out previously in connection with the self-aligning packing gland 32 and its clamping rings 60–62 depicted in FIG. 1 of the drawings. In furtherance of this purpose, however, it may be reviewed that each of the inner clamping rings 114 and 118 are provided with axially and inwardly extending lip portions 170 and 172, respectively, which are sealed by means of O-ring sealing means denoted generally at 174 and 176 to the adjacent end portions of the cylinder 102. Because of the greater required diameter of the left-hand inner clamping ring 114, the adjacent cylinder end portion is stepped at 178 in order to accommodate the O-ring seal.

Because of the extreme lengths of the piston rods 138 and 140, which in many applications are forty feet or more, their tendency to variably sag is accommodated at each end of the piston and cylinder arrangement 100 by the self-aligning packing glands 166 and 168, whose axial deviation will follow closely the angular displacement of the piston rods at the points of their entry into the ends of the cylinder 102. Loading on the packing glands 166 and 168 is minimized by the horizontal trunnion support 110 provided for the cylinder 102 which provides for alignment of the cylinder with the path of travel of the piston rod.

Figure 4:
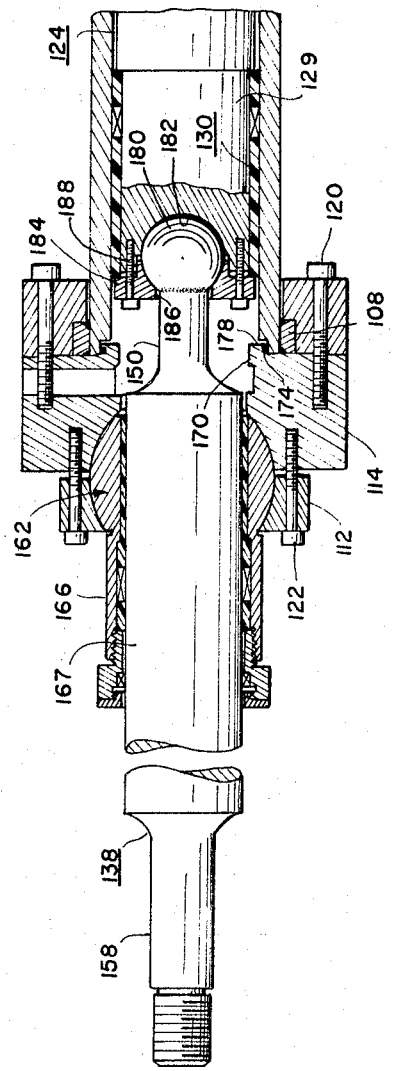
FIG. 4 is a cross-sectional view of still another embodiment of the invention in which the piston rod is connected to its associated piston through a ball-and-socket arrangement.

Referring now to FIG. 4 of the drawings, additional means are provided for relieving the bending stresses at the piston rod connections. In the latter arrangement of the invention in which similar reference characters refer to similar parts of FIG. 3 of the drawings, the necked-down portion 150 of the piston rod 138 is threadedly connected to a ball member 180 which is rotatably clamped in a spherical recess 182 formed cooperatively in the adjacent end of the piston 124 and an annular clamping plate 184. The narrowest portion 186 of the opening through the clamping plate 184 is arranged to afford sufficient clearance for the piston rod end 150 extending therethrough for the anticipated angular displacements thereof. When assembled, the clamping plate 184 can be spaced from the adjacent end of the piston 124 as denoted by reference character 188 for the dual purposes of preloading the piston bearing and packing arrangement 130 and for applying adjustable clamping pressures to the ball member 180.

With the latter arrangement of the invention, it will be seen that variable angular displacement of the piston rod 138 allows axial deflection thereof relative to the cylinder 102 while still maintaining an effective seal with the end closure thereof, by means of the self-aligning gland 166, and at the same time prevents the application of bending stresses to the end of the piston rod where it would be otherwise rigidly joined to the piston 124. These bending stresses are relieved by the ball-and-socket arrangement 180–184 irrespective of whether the bending stresses would be applied by the piston 138 or by forces otherwise applied to the cylinder 102 as by manipulation of a piston rod at the other end thereof where used or by other desired or undesired forces or motions imparted to the cylinder 102. It is understood, of course, that either one or both ends of the piston 124 (FIG. 3) can be equipped with ball-and-socket joints such as that illustrated in FIG. 4.

Although the invention has been shown in connection with certain specific embodiments, it will be readily apparent to those skilled in the art that various changes in form and arrangement of parts can be made to suit the individual requirements of various applications without departing from the spirit and scope of this invention. Moreover, it is to be understood that certain features of the invention can be utilized without a corresponding use of other features.

I claim as my invention:

1. In a piston and cylinder arrangement, the combination of an elongated cylinder housing, a self-aligning packing gland carried at one end of said cylinder housing and having a spherically-shaped surface rotatable within a cooperating stationary spherically-shaped recess carried on said one end of said housing, a longitudinal opening extending through said packing gland, a piston reciprocable within said cylinder housing, a piston rod connected to the piston and extending through the opening in said packing gland, and stationary trunnion means for pivotally supporting said cylinder housing along a pivotal axis extending substantially normal to the anticipated plane of angular displacement of said piston rod and said packing gland relative to said cylinder housing in order to minimize bending stresses at the junction of said piston rod and said piston.

2. In a piston and cylinder arrangement, the combination comprising an elongated cylinder housing, a piston reciprocable within said cylinder housing, a piston rod connected to the piston, annular sealing means secured to at least one end of said cylinder housing, a self-aligning packing gland having a spherical outer surface configuration adjacent one end thereof, said spherical configuration engaging a complementarily shaped surface configuration in said sealing means, means for clamping said spherical surface and said sealing means complementary surface together to permit pivotal movement of said packing gland relative to said annular sealing means and to said cylinder housing, said packing gland receiving said piston rod in closely fitted and sealing relationship, and stationary trunnion means for pivotally supporting said cylinder housing along a pivotal axis substantially normal to the anticipated plane of angular displacement of said piston rod and said packing gland relative to said cylinder housing in order to minimize bending stresses at the junction of said piston rod and said piston.

3. In a double-acting piston and cylinder arrangement, the combination comprising an elongated cylinder housing, an elongated piston mounted for reciprocating movement within said housing, a piston rod joined to each end of said piston and extending outwardly of said housing for movement along a fixed straight-line path of travel, annular sealing means joined to each end of said cylinder housing and surrounding said piston rods respectively, a self-aligning packing gland mounted at each end of said cylinder housing, each of said packing glands having an outer surface of spherical configuration adjacent one end thereof and seated in a complementarily shaped central opening of the associated annular sealing means, means for clamping said packing gland surfaces in engagement with said annular sealing means openings respectively to permit pivotal movement of said packing glands relative to said annular sealing means and to said cylinder housing, said piston rods extending through and closely fitted within said packing glands respectively to seal their entry into said cylinder housing and to permit angular displacement thereof relative to said cylinder housing, and stationary trunnion means pivotally supporting said cylinder housing at a transverse axis thereof, said transverse axis being substantially normal to the plane of anticipated angular displacements of said piston rods in order to equalize the bending stresses therein at their respective junctions with said piston.

References Cited by the Examiner

UNITED STATES PATENTS

| | | | |
|---|---|---|---|
| 86,974 | 2/1869 | Davidson | 92—167 |
| 373,072 | 11/1887 | Jarvis | 92—167 |
| 872,786 | 12/1907 | Beazell | 92—187 X |
| 1,655,159 | 1/1928 | Parrish | 277—4 X |
| 1,771,250 | 7/1930 | Feild | 377—30 X |
| 1,902,360 | 3/1933 | Foster | 277—30 |
| 2,194,374 | 3/1940 | Wunsch | 92—118 |
| 2,220,180 | 11/1940 | Spitzglass et al. | 92—20 X |
| 3,069,178 | 12/1962 | Rosen. | |
| 3,224,817 | 12/1965 | Miller et al. | 308—3.5 |

FOREIGN PATENTS 6,485    1887    Great Britain.

MARTIN P. SCHWADRON, *Primary Examiner.*

MARK NEWMAN, *Examiner.*

I. C. COHEN, *Assistant Examiner.*